United States Patent
Brice et al.

(10) Patent No.: US 7,567,964 B2
(45) Date of Patent: Jul. 28, 2009

(54) CONFIGURABLE SEARCH GRAPHICAL USER INTERFACE AND ENGINE

(75) Inventors: John Brice, Pleasanton, CA (US); James N. Phelps, Chicago, IL (US); Sargent L. Kennedy, Alamo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 597 days.

(21) Appl. No.: 10/434,983

(22) Filed: May 8, 2003

(65) Prior Publication Data

US 2007/0185826 A1 Aug. 9, 2007

(51) Int. Cl.
*G06F 17/30* (2006.01)

(52) U.S. Cl. .................. 707/9; 707/3; 713/201; 715/743

(58) Field of Classification Search ........... 707/2, 707/3, 6, 9, 10, 100; 704/9; 713/201; 715/743; 726/4; 345/853
See application file for complete search history.

(56) References Cited

U.S. PATENT DOCUMENTS

| | | | | | |
|---|---|---|---|---|---|
| 5,652,908 | A | * | 7/1997 | Douglas et al. | 714/4 |
| 5,828,674 | A | * | 10/1998 | Proskauer | 714/724 |
| 5,956,711 | A | * | 9/1999 | Sullivan et al. | 707/6 |
| 5,974,409 | A | * | 10/1999 | Sanu et al. | 707/3 |
| 6,278,999 | B1 | * | 8/2001 | Knapp | 707/9 |
| 6,321,226 | B1 | * | 11/2001 | Garber et al. | 707/10 |
| 6,401,091 | B1 | * | 6/2002 | Butler et al. | 707/10 |
| 6,421,675 | B1 | * | 7/2002 | Ryan et al. | 707/100 |
| 6,529,910 | B1 | * | 3/2003 | Fleskes | 707/10 |
| 6,801,904 | B2 | * | 10/2004 | Chaudhuri et al. | 707/2 |
| 7,027,975 | B1 | * | 4/2006 | Pazandak et al. | 704/9 |
| 7,076,736 | B2 | * | 7/2006 | Hugh | 715/743 |
| 7,120,928 | B2 | * | 10/2006 | Sheth et al. | 726/4 |
| 2001/0051940 | A1 | * | 12/2001 | Soulanille | 707/3 |
| 2002/0089551 | A1 | * | 7/2002 | Hugh et al. | 345/853 |
| 2002/0194502 | A1 | * | 12/2002 | Sheth et al. | 713/201 |
| 2002/0198885 | A1 | * | 12/2002 | Streepy | 707/100 |

* cited by examiner

*Primary Examiner*—Shahid A Alam
(74) *Attorney, Agent, or Firm*—Townsend and Townsend and Crew LLP

(57) ABSTRACT

A configurable search engine is provided in which, in an embodiment, by running the search engine an administrator can configure the search options available to a user by selecting from a choice of options without writing code. The user may be able to further configure the search options. In an embodiment, the search engine combines searches of multiple tables in a manner that appears seamless to the user.

18 Claims, 11 Drawing Sheets

CONFIGURABLE SEARCH GRAPHICAL USER INTERFACE AND ENGINE

BACKGROUND

1. Field of the Invention

This invention relates to search engines and their Graphical User Interfaces (GUIs).

2. Discussion of Prior Art

Although possibly not previously recognized, searching for data in a large relational database using methods developed for searching pages on the Internet has been a difficult challenge. The openness or free-form way of thinking about data on the Internet has not fit well with searching the "parent-child" structure of data in relational databases. Typical Internet searches are based on keywords, and the user may be presented with an enormous set of results, with up to thousands of matches, and those searches typically search only a fraction of all the data on the Internet. Furthermore, keyword searches often present results that the user did not intend to search for, making it difficult to find all of the relevant results, because of the large volume of unwanted data that must be reviewed in order to find all of the relevant results.

Fortunately for Internet search engines, the searcher often may not care whether every relevant piece of information obtainable or every relevant website was found, so long as the search produces enough information to satisfy the searcher's curiosity. In contrast, when searching a large relational database it may often be desirable to search the entire database or an entire set of data and/or find every relevant piece of data, while limiting the number of unwanted results. For example, the finding of only some of the employees subject to a particular tax withholding while also finding thousands of other employees may be an unacceptable search result when searching for all of the employees subject to this particular tax withholding that are recorded in an accounting department's database.

Documents on a database can be arranged into fields that can be searched separately from the rest of the text. By using search fields, the number of unwanted results may be minimized. Consequently, although possibly not previously recognized, it may be desirable to make more use of fields when searching a relational database than when searching the Internet. However, although also possibly not previously recognized as problems, there are many difficulties in using prior art search engines for relational databases. For example, different types of users may need to use different sets of search fields, operators, and searching parameters. Presenting all available search fields, operators, and search parameters to each searcher may make the search engine difficult to use, because the individual searcher may be overwhelmed with the multitude of fields and/or search options that are unnecessary for his or her search.

Although some prior art search engines allow the user to configure the format of the output, they do not typically allow the format presented for inputting the search to be configured. For example, prior art search engines do not typically allow the types of fields and operators that are available to the individual searcher to be personalized for the user. Typically, reconfiguring a search engine so that different search fields, operators, and search parameters are available to a particular user requires writing or rewriting lines of computer code. Specifically, if an administrator wants to change the fields, operators, and search parameters available to different types of searchers, the code defining the search engine may need to be rewritten.

Also, although some software may allow an administrator to determine which users have access to different data, the access is controlled by a separate program or a separate part of the program rather than from within the search engine. Further, not every organization necessarily has security software for restricting access to data. Prior to purchasing a search engine the organization may not have had a need for restricting the access, because without the search engine the restricted data may have been essentially inaccessible by those who are not supposed to access it. Thus, the new search engine may introduce new security issues.

Additionally, in a relational database, it may be difficult to match the information stored in different tables about the same sales lead, for example, because of insufficient identifying information in one of the tables.

SUMMARY OF THE INVENTION

In an embodiment, a search engine can be configured from within the search engine by running the search engine. A set of predefined fields is provided from which an administrator can choose to make available to a given user or a given type of user. The user may then be given the option of further personalizing the search setup. In an embodiment, the security access may also be controlled from within the search engine reducing the need for having or reconfiguring another security system on the same computer as the search engine.

In an embodiment, identifiers are added to the tables of a database so that data relating to the same component can be matched to that component despite being located in different tables (in contrast to the prior art, in this context a component is any item being searched for). In an embodiment, the identifiers are numbers or sequences of alphanumeric characters. In an embodiment, the search engine reads and analyzes the identifiers without any need for the user to be aware of the operations performed relating to the identifier. In an embodiment, the component identifiers may be the synchronization identifiers or product identifiers, and the category identifiers may be transactional identifiers, lead identifiers, and/or record identifiers. Ordinarily, synchronization identifiers are used so that when connecting to a mobile device the objects in the mobile device can be identified. Each object in the mobile database is given a unique identifier or synchronization number so that the objects of the mobile device can be identified. These synchronization numbers may be used for the component identifiers. Specifically, in this embodiment, the component identifier is used to connect the views of different tables and/or records, while lead identifiers are used to connect the contents within the actual tables and/or records and identify them as being part of the same lead. However, other identifiers may be used for matching items that are part of the same component, but that are located in different places within a table and/or in multiple tables.

The search engine may include both the facilities to use the identifiers and the ability to be configured. Alternatively, the search engine may only be configurable, but not have the ability to take advantage of the identifiers or may have the ability to use the identifiers, but not be configurable.

DETAILED DESCRIPTION OF EXEMPLARY EMBODIMENTS OF THE INVENTION

Systems and methods are described that allow groups of users (such as organizations, companies, and other groups of users having a database, more than one user, and more than one level of access) to have one user (e.g., an administrator) configure a search engine for another user having a lower level of access, without the need for reprogramming the search engine. The search engine provides facilities for an administrator to set up fields that can be searched on a particular document or set of documents, for example. Optionally, security access can also be configured from within the search engine. In an embodiment, if allowed by the settings chosen by the administrator, any given searcher may be provided with the facilities to personalize the portion used by that searcher for searching. In an embodiment, the search engine is also capable of searching several different tables for information related to the same component seamlessly, without the searcher necessarily being aware of from which table each portion of the information was retrieved.

Figure 1:
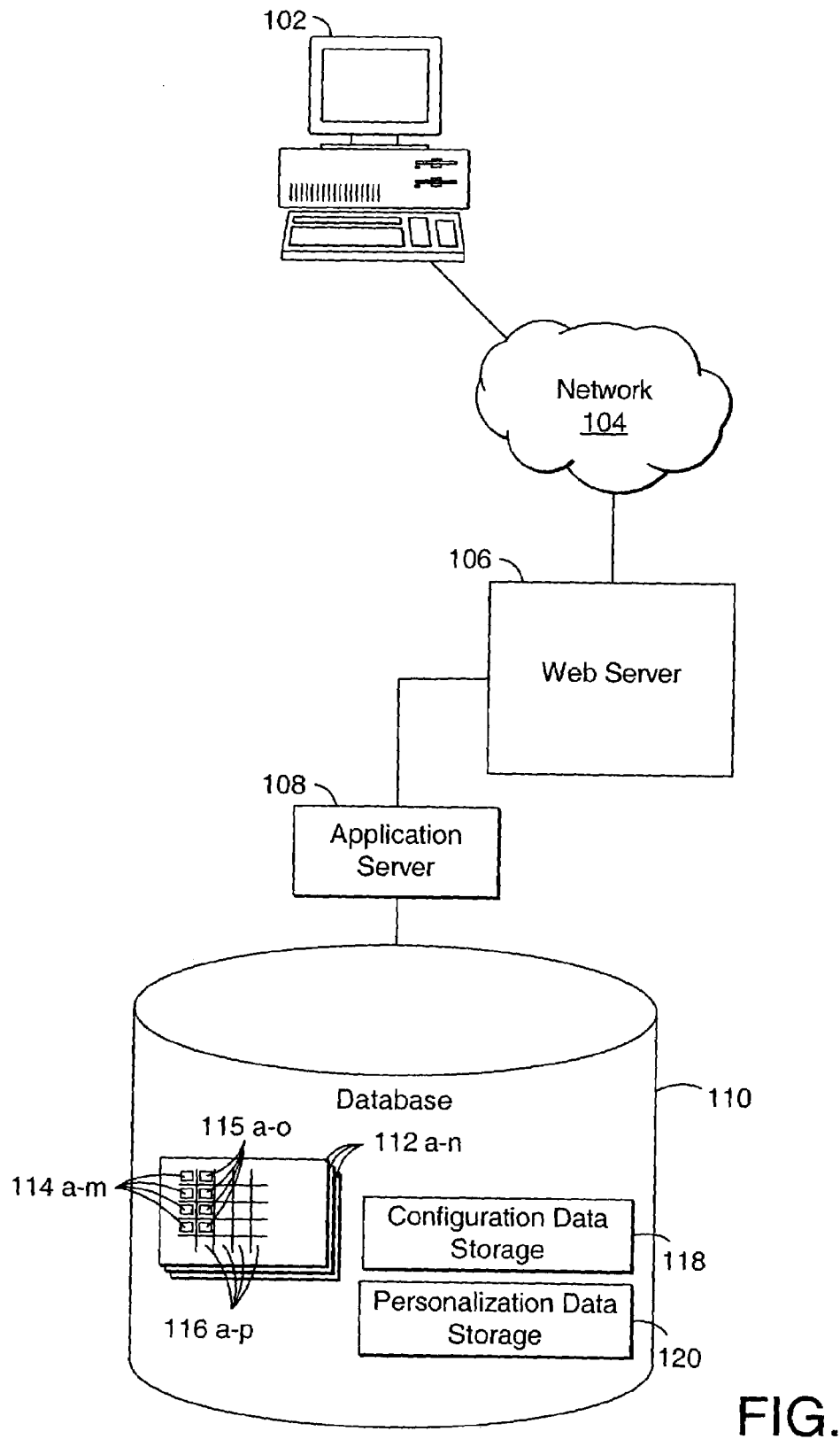
FIG. 1 is a block diagram of a data retrieval system according to the invention.

FIG. 1 shows data retrieval system 100 according to the invention. In an embodiment, data retrieval system 100 includes appliance 102, network 104, web server 106, application server 108, database 110, tables 112a-n, component identifiers 114a-m, category identifiers 115a-o, fields 116a-p, configuration data storage 118, and personalization data storage 120. In alternative embodiments, system 100 may not have all of the elements listed above, or may have other elements in addition to or instead of those listed above.

In FIG. 1 appliance 102 may be any appliance capable of communicating via network 104. For example, appliance 102 may be an Internet appliance, a cell phone capable of accessing a network (such as the Internet and/or an intranet), a terminal, a laptop, a personal computer, or a workstation. Network 104 may be any one of, any combination of, or a combination of all of a Local Area Network (LAN), a Wide Area Network (WAN) such as the Internet, and/or a Public Switched Telephone Network (PSTN), for example. Network 104 may have several web servers attached to it. Appliance 102 may use network 104 to communicate with web server 106. In an embodiment, appliance 102 may be connected directly to web server 106.

Data retrieval system 100 may have any number of appliances 102 communicating (directly or via network 104) with web server 106. Web server 106 may be capable of interfacing with network 104. For example, web server 106 may include Internet search engines, and may be capable of communicating with other web servers connected to network 104. Web server 106 communicates with application server 108.

Application server 108 runs the configurable search engine. Application server 108 may also run a variety of applications having a variety of purposes, any number of which may be unrelated to searching. Appliance 102 may access and/or run (via network 104 and web server 106) any one of, any combination of, or all of the applications running on application server 108. In an embodiment, appliance 102 may be connected directly to application server 108. In an embodiment, web server 106 and application server 108 may be two applications running on the same computer. In an embodiment, a user may directly use and run the configurable search engine on application server 108. In this embodiment, appliance 102 and web server 106 may not be part of data retrieval system 100. Any one of, any combination of, or all of web server 106, application server 108, and database 110 may be connected to one another via one or more networks such as network 104.

Database 110 stores tables 112a-n, and is connected to application server 108. Appliance 102 may use the configurable search engine running on application server 108 to search tables 112a-n in database 110. Database 110 may include one or more processors and/or one or more memory devices. The processors and/or memory devices may be located in one location or distributed among several locations connected via a LAN and/or Wan. Database 110 may also be a collection of data files, which may be located in one location or distributed among several systems.

Tables 112a-n may store components and/or information related to components. Although in the prior art, the term component is used to refer to a transaction, such as a sales lead, in this specification the term component is used in a broader sense and is not limited to only to sales and customer transactions. Instead, in this specification the term component refers to the basic unit that is being searched for whether or not the basic unit is a transaction. For example, the term component may refer to any file, object, program, or document that may be stored in a database and searched. As a further example, in a system for searching for journal articles, each journal article is a component. Alternatively, in other embodiments any document, and/or any of several specified types of fields may be components.

In an embodiment, tables 112a-n may have component identifiers 114a-m, and category identifiers 115a-o added to them to aid in identifying which component a table entry is associated with. In an embodiment, each of the components on tables 112a-n is organized into fields 116a-p. The number of tables 112a-n, component identifiers 114a-m, category identifiers 115a-o, and fields 116a-p are unrelated to one another as indicated by the different ranges a-m, a-n, a-o, and a-p. Each of the letters m, n, o, and p represent numbers. Any of m, n, o, and p can be equal to, bigger than, or smaller than any of the other three numbers represented by these letters. Different tables of tables 112a-n may contain different categories of information. Configuration data storage 118 and personalization data storage 120 are one or more regions in database 110 in which information about the manner in which the search engine is to be configured and personalized for each user is stored, respectively.

Figure 2:
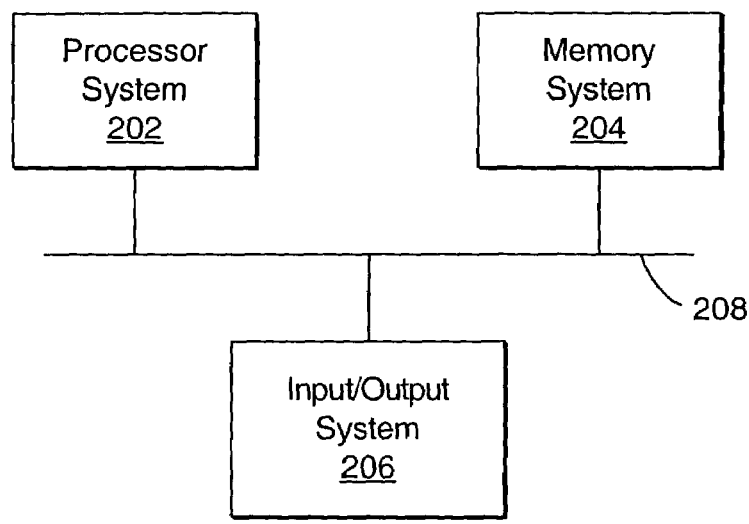
FIG. 2 is a block diagram of the application server of FIG. 1.

FIG. 2 shows application server 108 of FIG. 1. In an embodiment, application server 108 includes processor system 202, memory system 204, input/output system 206, and communications system 208. In alternative embodiments, application server 108 may have other elements in addition to or instead of those listed above.

Processor system 202 may run a variety of applications and may include only a single processor or any number of processors. The processors of processor system 202 may include general purpose processors, which may be configured to run in parallel with one another or in a distributed computing system. Processor system 202 may include one or more special purpose processors such as a memory management processor and a mathematical computations processor. Processor system 202 runs the applications that form the configurable search engine.

Memory system 204 may include one or any number of memory devices. Memory system 204 may include long term and/or short term memory, for example. Some examples of long term memory devices that may be included in memory system 204 are hard drives, optical disk drives, and tape drives. Some examples of short term memory that may be included in memory system 204 are Random Access Memory (RAM) and cache memory. Any one of, any combination of, or all of the processors of processor system 202 may have a cache memory dedicated to it. Memory system 204 may include a database, such as database 110 and/or another database. Memory system 204 is discussed further in relation to FIG. 3. In an embodiment, configuration data storage 118 and personalization data storage 120 may be stored in memory system 204 in addition to or instead of being stored in database 110.

Input/output system 206 may include any number of and/or any combination of modems, monitors, keyboards, track balls, mice, touch pads, touch sensitive screens, and/or interfaces to outside systems and/or networks, for example. In this specification, the term pointing device is used to denote any input and/or output device that can be used for moving a cursor or an arrow on a monitor. Some examples of pointing devices may include mice, trackballs, touch sensitive pads, touch sensitive screens, and the combination of the direction arrows and the enter key on a keyboard. Input/output system 206 allows application server 108 to communicate with database 110, web server 106, and/or a local computer operator, for example (FIG. 1).

Communications system 208 may include a bus or one or more electrical and/or optical communications systems, for example. Communications system 208 is for sending messages and transferring data between processor system 202, memory system 204, and input/output system 206. If processor system 202 includes distributed processors, communications system 208 and/or processor system 202 may include a system for managing access to the components of communications system 208, for example.

In embodiments in which the web server 106 and application server 108 are different computer systems, they may both have substantially the same structure as in FIG. 2. Similarly, in embodiments in which appliance 102 is a computer system, appliance 102 may also have substantially the same structure as in FIG. 2. However, the contents of memory system 204 will be different, because each of appliance 102, web server 106, and application server 108 run and store different sets of applications.

Figure 3:
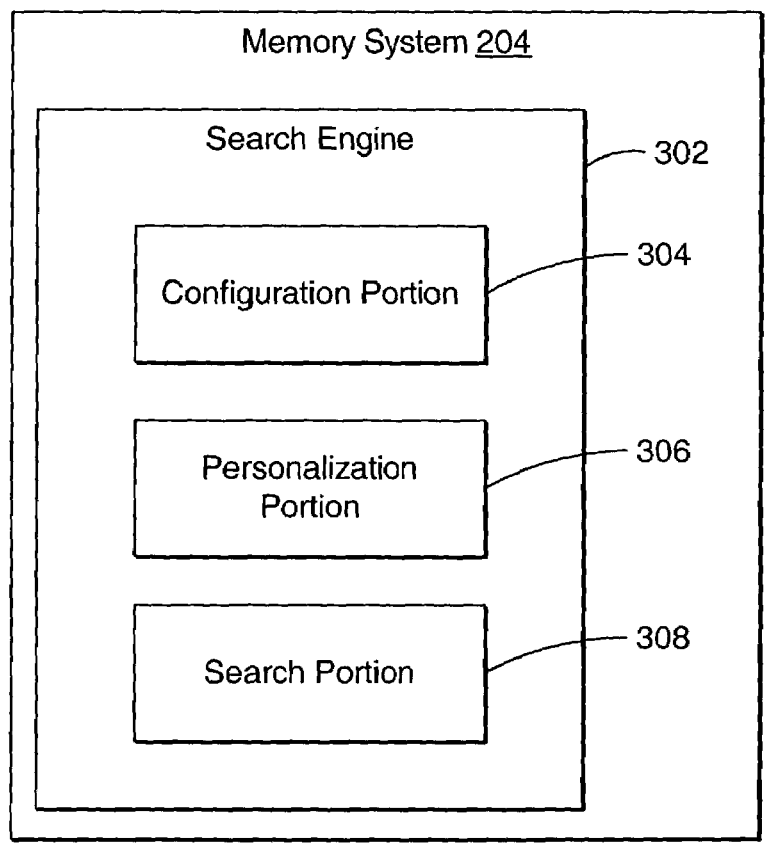
FIG. 3 is a block diagram of the memory system of application server of FIG. 1.

FIG. 3 shows memory system 204 of application server 108. Stored within memory system 204 is a search engine 302. In an embodiment, search engine 302 may include a configuration portion 304, a personalization portion 306, and a search portion 308. In alternative embodiments, memory system 204 may not have all of the elements listed above, or may have other elements in addition to or instead of those listed above.

Configuration portion 304 may be used by an administrator, for example, to configure search engine 302 to have the desired search fields, layout, security access, and behavior. Configuration portion 304 stores the configuration information in configuration data storage 118. The administrator chooses from predefined fields and lists of options for the layout, security access, and the behavior of the search engine, thereby allowing search engine 302 to be configured without being rewritten. Personalization portion 306 is used by a user, for example, to further personalize the search fields, the layout, the access, and the behavior of search engine 302 according to his or her personal needs and tastes. Personalization portion 306 stores the personalization information in personalization data storage 120. Search portion 308 is used for performing the search in the manner specified by configuration portion 304 and personalization portion 306. Each of configuration portion 304, personalization portion 306, and search portion 308 has associated with it a corresponding portion of the Graphical User Interface (GUI) and of the underlying coding of search engine 302.

Figure 4A:
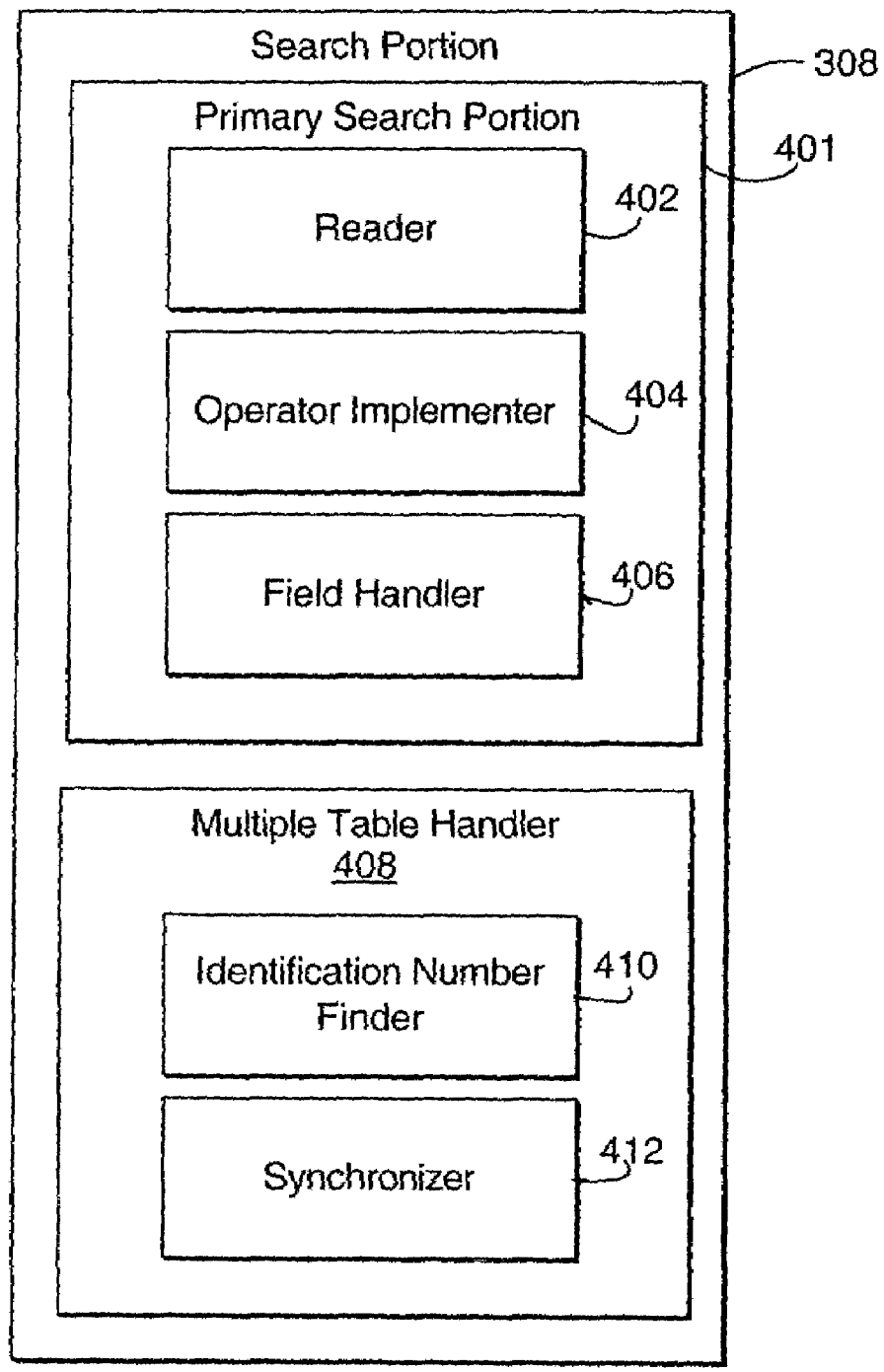
FIG. 4A is a block diagram of the search portion of the search engine of FIG. 3.

FIG. 4A shows search portion 308 of search engine 302. In an embodiment, search portion 308 includes primary search portion 401, reader 402, operator implementer 404, field handler 406, multiple table handler 408, identification number finder 410, and synchronizer 412. In alternative embodiments, search portion 308 may not have all of the elements listed above, or may have other elements in addition to or instead of those listed above.

Primary search portion 401 includes reader 402, operator implementer 404, and field handler 406. When the user desires to perform a search, the user enters a search query (which may also be referred to as the search definition). The search query is a series of search entities joined by operators. Search entities are any item that can be searched for and that are contained within the desired component. Search entities may be used to locate the desired component. Some examples of search entities are words, numbers, letters, symbols, and/or punctuation marks. In contrast, some examples of components are documents, computer programs, files, and folders. Reader 402 reads the text of a component and may separate the text read into searchable entities, for example. Operators limit the manner in which the search entity can appear in the component. Some examples of operators are "and," "or," "w/x" (within a range of "x" words or letters, where x is a number), ranges, and fields.

Operator implementer 404 applies operators to individual searchable entities of a current search, groups of searchable entities of a current search, and/or search results of another search. A find of a search entity or a search query may be referred to as a "hit." The results of the search is an identification of the components that meet the search query. If specified by the search query, reader 402 and operator implementer 404 search the full information contained in one of tables 112a-n. The table chosen to search, which will be referred to as the primary table and will be assumed to be table 112a, may depend on the search query, the user (e.g., the configuration of search engine 302 determined by an administrator using configuration portion 304 and/or the user using personalization portion 306), and/or appliance 102 from which the search was performed. Tables 112b-m may be referred to as secondary tables.

Field handler 406 identifies fields and allows the fields to be searched separately from the rest of the component by reader 402 and operator implementer 404. Under the direction of field handler 406, operator implementer 404 combines the search results from the individual fields and of the full component information contained in the primary table to arrive at a list of components that meet the search query.

In an embodiment, search portion 308 first performs a search based on finding a component in table 112a, for example. Within table 112a items belonging to the same category are identified with the same one of category identifiers 115*a-o*. For example, in a search for the salary of an employee, all the salary information may have the same category identifier. Consequently, search portion 308 will first find all the table entries having the same category identifier (e.g., the category identifier for salaries), and then limit the number of hits to those also having the correct employee name.

Field handler 406 may be configured so that the search may be performed in different ways, such as by product or by salesperson. Similarly, field handler 406 may be set up so that each of the pages of the component could be searched in different ways, and thereby be capable of handling different types of pages. For example, each page may have its information organized differently and therefore may include different ones of the plurality of fields 116*a-p*. Consequently, field handler 406 may provide different ways of searching each of these differently organized pages according to the different sets of fields provided. Any one of, any combination of, or all of the independent or distinct groups of data associated with a page may have an accompanying search field selected from fields 116*a-p*. Field handler 406 allows of any of fields 116*a-p* to be used to form part of the search definition.

Multiple table handler 408 allows searches to be performed on multiple tables. A search on multiple tables 112*a-n* of database 110 may be referred to in this application as a "deep search." Often certain types of information and/or certain fields may be contained in one or more of secondary tables 112*b-n*. Were component identifiers 114*a-m* not added, the information and/or fields contained in secondary tables 112*b-n* may not have any explicit component identification associating the information and fields with their respective components.

Multiple table handler 408 includes identification number finder 410 and synchronizer 412. After finding a hit in primary table 112*a*, identification number finder 410 extracts the component identifier (which is one of the component identifiers 114*a-m*) of the component found and then searches for that component in one of the other tables by its component identifier. Next, synchronizer 412 directs primary search portion 401 to search the information about the components for the search items sought within one or more of secondary tables 112*b-n*, and accordingly limits the hits. Synchronizer 412 uses operator implementer 404 to combine the search results from secondary tables 112*b-n* and primary table 112*a*. In an embodiment, the user is not given any indication as to which or how many tables are being searched. In an embodiment, during a debugging mode, for example, the user may be given information regarding which tables 112*a-n* are searched and the part of the query that were applied to each of tables 112*a-n* that were searched.

Figure 4B:
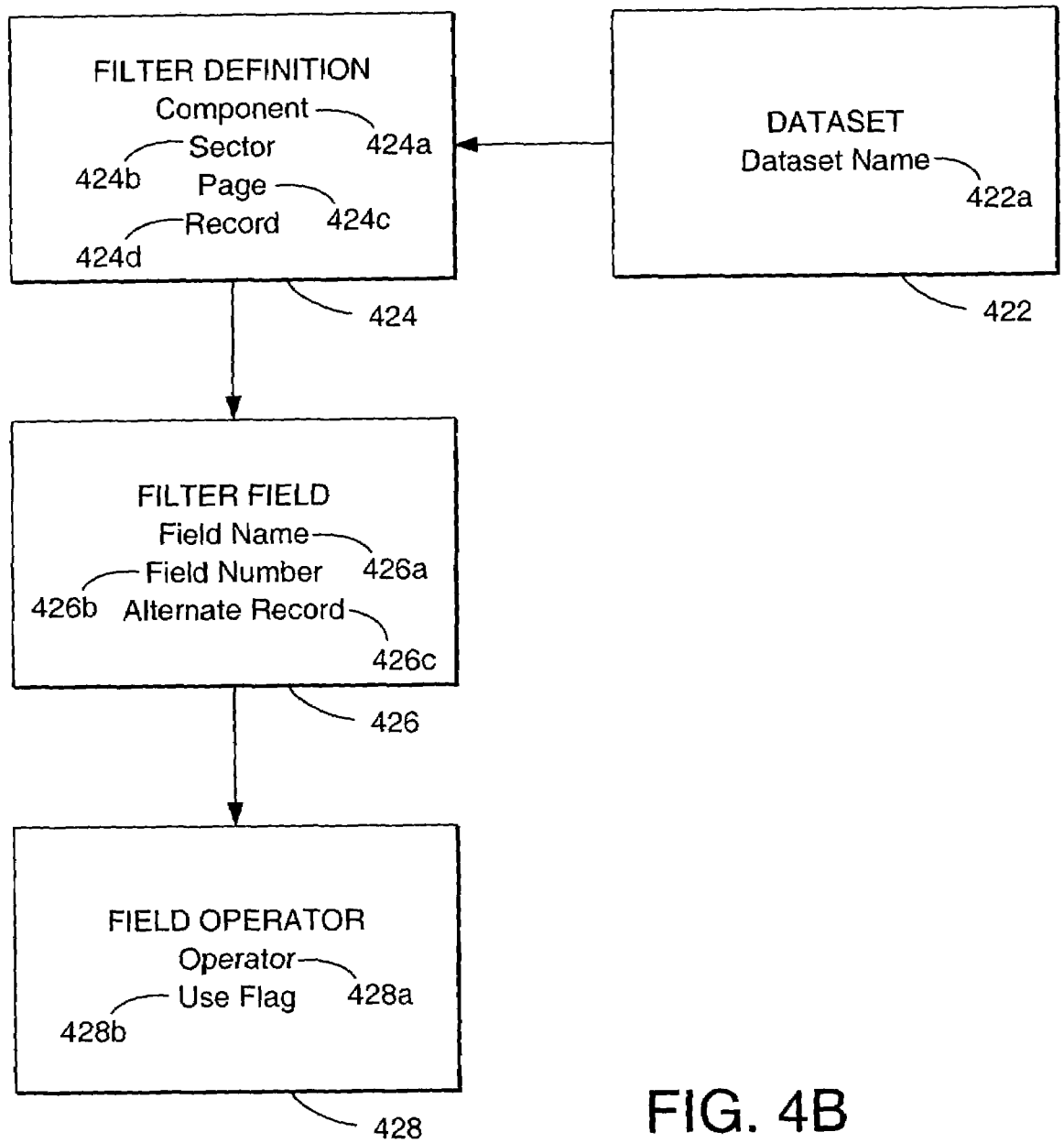
FIG. 4B is an Entity Relationship Diagram (ERD) of the data retrieval system of FIG. 1.

FIG. 4B is an Entity Relationship Diagram (ERD) 420 related to security, multiple table handling, and configurability aspects of data retrieval system 100. In an embodiment, ERD 420 includes a dataset 422, a dataset name 422*a*, a filter definition 424, a component 424*a*, a sector 424*b*, a page 424*c*, a record 424*d*, a filter field 426, a field name 426*a*, a field number 426*b*, an alternate record 426*c*, a field operator 428, an operator 428*a*, and a use flag 428*b*. Data retrieval system 100 may include many other entities.

Each entity of ERD 420 includes one or more elements listed within each entity box. The name of the entity is in all capital letters and the names of the elements only have the first letter of their names capitalized. Other elements not listed may also be included in the entities of data retrieval system 100 in addition to the ones illustrated in FIG. 4B. Following the conventions typically used for ERDs, a line connecting two entities indicates a relationship. An arrowhead connecting to an entity box indicates that there may be many entities of the type represented by the entity box to which the arrowhead points. In contrast, a straight line connection (not having an arrowhead) indicates that there is only one entity associated with the entity box to which the straight line is connected. Thus, a line having a single arrowhead represents a many-to-one relationship, while a line having arrows at both ends represents a many-to-many relationship, for example. Although in ERD 420 only one-to-many relationships are illustrated, embodiments of the invention may also include entities having one-to-one and many-to-many relationships to each other.

Dataset 422 represents a set of data found within tables 112*a-n*. Dataset 422 may be identified by a dataset name 422*a*, for example. Filter definition 424 is associated with search engine 302. Filter definition 424 may contain a filter definition for each component 424*a* to be searched. The filter definition 424 may limit (or "filter") which portions of dataset 422 can be searched. Filter definition 424 may be used for maintaining security by limiting access of information to those that are entitled to view it. Each component 424*a* may be divided into sectors 424*b* (e.g. markets), which may be divided into pages 424*c*, which in turn may be further divided into records 424*d*. In an embodiment, different components 424*a* may have sectors 424*b* having the same name. Similarly, different sectors 424*b* may have pages 424*c* having the same name, and different pages 424*c* may have records 434*d* having the same name. Thus, the portion of dataset 422 that can be searched may be identified by a component 424*a*, a sector 424*b*, a page 424*c*, and a record 424*d*. In a sales application, sector 424*b* corresponds to a particular market sector. Optionally, when filter definition 424 is connected to dataset 422, the data distribution rules associated with dataset 422 automatically appear as checkboxes, for example, on a page for choosing the user's search configuration, page 424*c*, thereby allowing an administrator to choose which security rules to apply.

Filter field 426 may contain all of or any collection of the fields from the search record that the user can search in accordance with filter definition 424. The fields within this collection of fields may be identified by a field name 426*a* and/or a field number 426*b*. Filter field 426 may also contain fields from any number of other alternate records 426*c*, such as secondary tables 112*b-n*, that the user can also search, thereby facilitating a multiple table search.

Field operator 428 allows the administrator to define which operators 428*a* the user should be allowed to use for the field of field filter 426, such as <, =, between, and/or contains, for example. Field operator 428 may further contain use flag 428*b* indicating if operator 428*a* can be used on dataset 422 and/or in which portions of dataset 422 operator 428*a* may be used.

Figure 5:
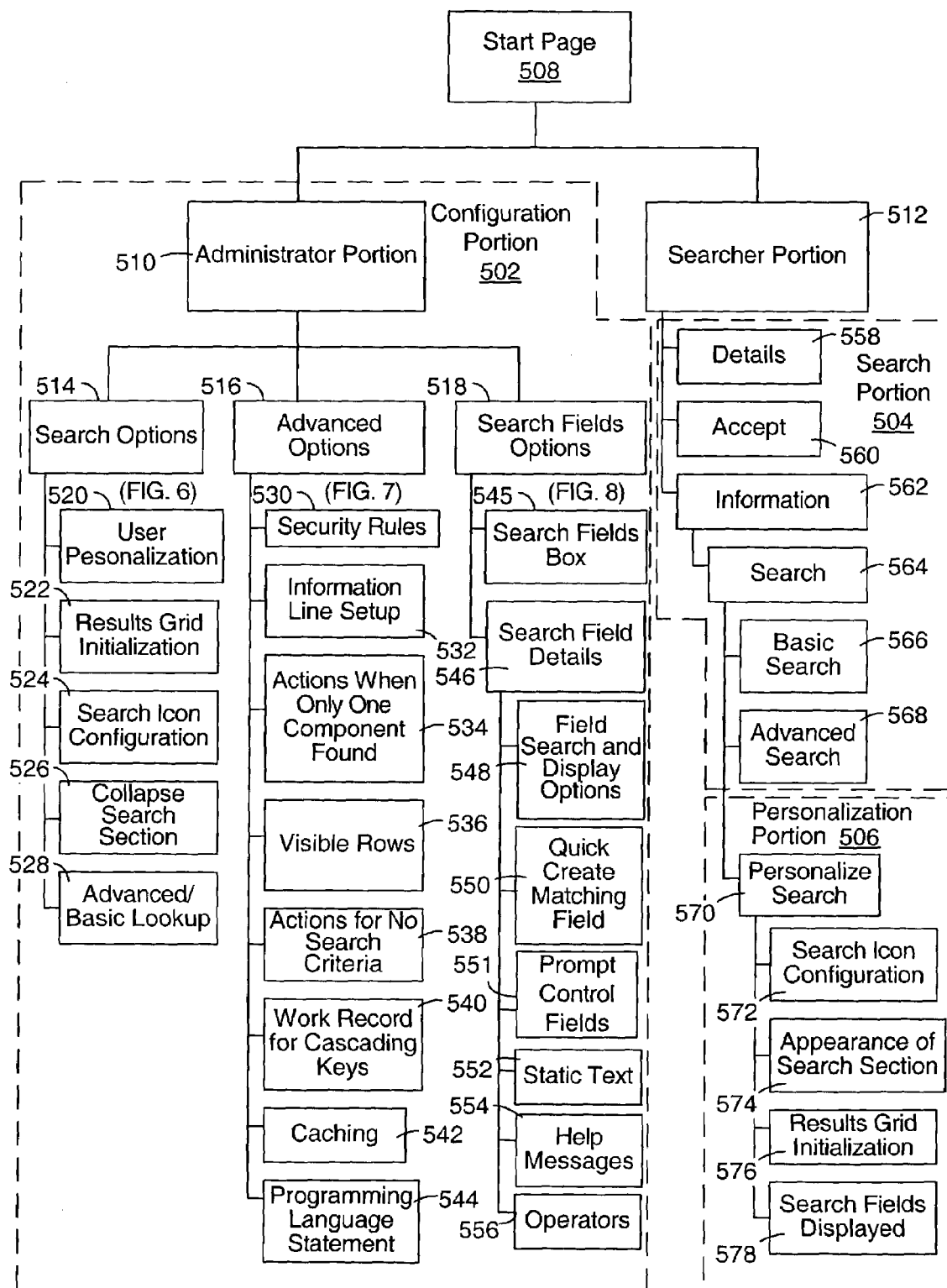
FIG. 5 is an organizational chart showing the relationship between various pages and fields of the Graphical User Interface (GUI) of this invention.

FIG. 5 is an organizational chart 500 showing the relationship between various pages and fields of the GUI of search engine 302. In an embodiment, organizational chart 500 includes configuration portion 502, search portion 504, personalization portion 506, start page 508, administrator portion 510, searcher portion 512, search options 514, advanced options 516, search field 518, user personalization 520, results grid initialization 522, search icon configuration 524, collapse search section 526, advanced/basic lookup 528, security rules 530, information line setup 532, actions when only one component found 534, visible rows 536, actions for no search criteria 538, work record for cascading keys 540, caching 542, programming language statement 544, search fields box 545, search field details 546, field search and display options 548, quick create matching field 550, prompt control fields 551, static text 552, help messages 554, operators 556, details 558, accept 560, information 562, search 564, basic search 566, advanced search 568, personalize search 570, search icon configuration 572, appearance of search section 574, results grid initialization 576, and search fields displayed 578. In alternative embodiments, organizational chart 500 may not have all of the elements listed above, or may have other elements in addition to or instead of those listed above.

Many of the parts placed in organizational chart 500 are associated with one of configuration portion 502, search portion 504, and personalization portion 506. Configuration portion 502, search portion 504, and personalization portion 506 are the GUI part of configuration portion 304, search portion 308, and personalization portion 310, respectively. Any of the boxes of organizational chart 500 may correspond to classes, objects, pages, dialog boxes, or fields on pages, for example. Each of the boxes of organizational chart 500 may be collapsible objects and may be accessible via links, such as tabs or icons, embedded within the object associated with the box hierarchically above it in organizational chart 500.

Start page 508 offers an administrator a choice of whether to go to the administrator portion 510 or to the searcher portion 512. A user that is not an administrator may see only searcher portion 512 upon opening search engine 302. Alternatively, the user may see start page 512, but will not be able to access administrator portion 510. The link to the administrator portion 510 may be completely absent from start page 508 or may be present, but may have an indication that the link does not function. For example, the shading of the link to the administrator portion 510 may be different to indicate that the link does not work. Searcher portion 512 will be discussed below.

Administrator portion 510 has links to search options 514, advanced options 516, and search field 518. Search options 514, advanced options 516, and search field 518 may be different sections of administrator portion 510. In an embodiment, administrator portion 510 displays a page of the selected one of search options 514, advanced options 516, and search field 518 in addition to links to the other two that are not selected. Advanced options 516 and search fields options 518 will be discussed below. Administrator portion 510 may provide a set or list of search options (such as operators and search fields) from which the administrator may choose to make available to a searcher. The choices made in the administrator portion 510 may alter the set of search options visibly available to the searcher. Search options 514 allows the administrator to select or specify options related to the appearance of and the functions available to the user when using search portion 504 and personalization portion 506. Search options 514 includes user personalization 520, results grid initialization 522, search icon configuration 524, collapse search section 526, and advanced/basic lookup 528.

User personalization 520 may allow the administrator to determine whether or not the user can personalize the search. If the user is allowed to personalize the search, user personalization 520 may also be used to designate the extent to which the user can personalize their search. Results grid initialization 522 may determine whether the results grid is displayed and/or given initial values before a search query is entered. If the results grid is given initial values, results grid initialization 522 determines how the initial results are determined. Search icon configuration 524 may determine the location and/or appearance of the search icon. Search icon configuration 524 may also determine the action that initiates a search, such as whether pressing the enter key will initiate a search or whether clicking on a pointing device such as a mouse will initiate a search.

Collapse search section 526 may determine whether the search section is initially collapsed or expanded when the search page is opened. Advanced/basic lookup 528 may determine whether the user is capable of accessing the basic and/or the advanced search. Advanced/basic lookup 528 may determine whether an option is included in the advanced search or the basic search. If both the basic and advanced search are available for the user, advanced/basic lookup 528 may also determine whether the basic search or the advanced search is the default. Search options 514, user personalization 520, results grid initialization 522, search icon configuration 524, collapse search section 526, and advanced/basic lookup 528 are discussed further in conjunction with FIG. 6.

Advanced options 516 allows the administrator to further configure the searching environment of the user. Advanced options may include security rules 530, information line setup 532, actions when only one component found 534, visible rows 536, actions for no search criteria 538, work record for cascading keys 540, caching 542, and programming language statement 544. Security rules 530 determines the datasets that can be searched by the user. Security rules 530 may also determine which datasets can be searched when no datasets are specified. Information line setup 532 may determine the location, the font, and the justification, for example, of various information lines that appear on the search page.

Visible rows 536 may determine the maximum number of rows from the search results grid that can be viewed at one time. Visible rows 536 may additionally or alternatively determine criteria for the order in which the hits appear. In an embodiment there may be a maximum number of hits or components that search engine 302 (FIG. 3) will retrieve. The rest of the components found may be discarded, and a warning may be displayed on the screen indicating that more components were found, but were not retrieved because there were too many. In an embodiment, the administrator may be able to control the maximum number of components that a search will retrieve.

Actions when only one component found 534 determines special actions that the search engine may take if there is only one hit. For example, ordinarily when multiple components are found, a list of the components found may be displayed that shows little information about any one component. If the user wants to view the details of a particular component, that component may be selected, and a view may be subsequently presented showing more details about the selected component. When only one component is found it may be desirable to immediately display the detailed view of that component.

Actions for no search criteria 538 determines the behavior when the search icon is selected, but no search criteria were entered. For example, all the components may be listed as hits or an error message may appear asking for an entry of a search query. Work record for cascading keys 540 allows an administrator to relate two of fields 116a-p without reprogramming configuration portion 304. For example, there may be a field for different countries, a field for provinces, and a field for states. The field for countries may have an entry for the United States and for Canada. Work record for cascading keys 540 allows the administrator to associate the states with the country entry United States and the provinces with the country entry for Canada. Caching 542 allows the administrator to allot an amount of cache from within memory system 204 available for a given user's searches. The administrator may be able to assign a priority level to the cache usage of a user, thereby determining which users get preferential usage of the cache.

Programming language statement 544 allows the administrator to determine whether the user can view the query statement in the programming language used by search engine 302 to perform the search. Using programming language statement 544, the administrator may be able to determine the location of the statement and/or the format of the statement. In an embodiment, the programming language statement is a Structured Query Language (SQL) statement. In an embodiment, the administrator may also be able to control which programming language is used for performing the search. Advanced options 516, security rules 530, information line setup 532, action when only one component found 534, visible rows 536, actions for no search criteria 538, work record for cascading keys 540, caching 542, and programming language statement 544 are discussed further below in conjunction with FIG. 7.

Search fields options 518 controls various details of the search page presented to the user including the search fields that can be searched and the behaviors of those search fields. Search fields box 545 controls which fields the user can search and the attributes and/or layouts of those fields. Search field details 546 determines identifying information related to the search field. Field search and display options 548 allows the administrator to choose whether various search options and display options are available to the user. For example, the search and display options 548 may allow the administrator to permit the user to select from multiple display options giving varying degrees of detail about a component.

Quick create matching field 550 is optional. Quick create matching field 550 allows the administrator to clone a search field. In other words, using quick create matching field 550, a search field could be created having the same properties as the one it was cloned from except that it has a different name and corresponds to a different part of the document. Prompt control fields 551 control prompts for control fields. In an embodiment, prompt control fields 551 control the conditions in which prompts are provided to the user to fill in blank fields or make a selection from a collection of choices, for example. In an embodiment, prompt control fields 551 may control the appearance and nature of the prompt, such as whether the prompt is provided as a callout box, a popup dialog box, or flashing static text next to a field improperly filled, for example.

Static text 552 allows the administrator to determine the contents, font, and location of static fields on the search page. Help messages 554 allows the administrator to determine which options have help messages associated with them, the action or actions that cause the help message to appear, and the content of the help messages. Operators 556 allow the administrator to select the operators (e.g., "and," "or," and "begins with") that can be applied to a field.

Searcher portion 512 may include details 558, accept 560, and information 562. Details 558 may allow the searcher to view the details of a component found. Details 558 may also identify the location of the hits within the component by highlighting the hits, for example. Accept 560 may allow the user to accept and/or save the results of a search and/or changes to the personalization.

Information 562 allows the user to conduct a search and personalize the search options. In a sales database, information 562 may be titled lead information and may relate to information about sales leads, for example. Information 562 may include search 564 which in turn may include basic search 566 and advanced search 568. Information 562 may also include personalize search 570, which in turn may include search icon configuration 572, appearance of search section 574, results grid initialization 576, and search fields displayed 578.

Search 564 allows the user to perform a search. Search 564 may have update features. Specifically, the representation of each component presented to the searcher may have a number of pages, such as an update page and an add page. The update page may show components found as a result of an update to a previous search performed by either redoing the old search (using the old search query) on all the data or on just the new data. Alternatively, the update may be a narrowing of the search, and the update page may be a replacement of the original page with a page having a subset of the hits that were on the original page. An add page may be included for displaying new components found as a result of broadening the search or performing the search on updated data.

When using basic search 566 of search 564, a basic set of options that are necessary for performing a search are available to the user. Basic search 566 may also include some options that are not necessary to perform a search, but that a novice is likely to find easy to use. Advanced search 568 may include the same search options available in basic search 566 and additional options as to the types of items that can be searched for, the types of operators that can be applied to search terms, and/or other features that aid in limiting the number of hits on components that are not of interest. There may be some features that are only available in basic search 556 and not in advanced search 568, because the advanced search has an equivalent option that may be harder to use, but performs in a more desirable fashion, for example.

Personalize search 570 allows the user to personalize the search options to his or her liking by choosing options from those selected within administrator portion 510. Search icon configuration 572 may be used to specify the location of the search icon, the icons associated with the search icon, and/or the types of actions that cause the search icon to be selected and/or initiate a search. Appearance of search section 574 allows the user to change the layout of the search section and choose whether the search section initially appears in collapsed or expanded form. Results grid initialization 576 allows the user to choose how the results grid is initialized. For example, results grid initialization may allow the user to choose whether the results grid is populated upon opening the search section. If the user chooses to populate the results grid upon opening the search section, the user may be able to specify the basis upon which the results grid is initially populated. For example, the results grid may be initially populated using the results from the last search or from a default search. Results grid initialization 576 may also allow the user to specify the default search. Search fields displayed 578 may allow the user to choose which search fields will be displayed in the results of a search and/or in the prompt for the search query.

Figure 6:
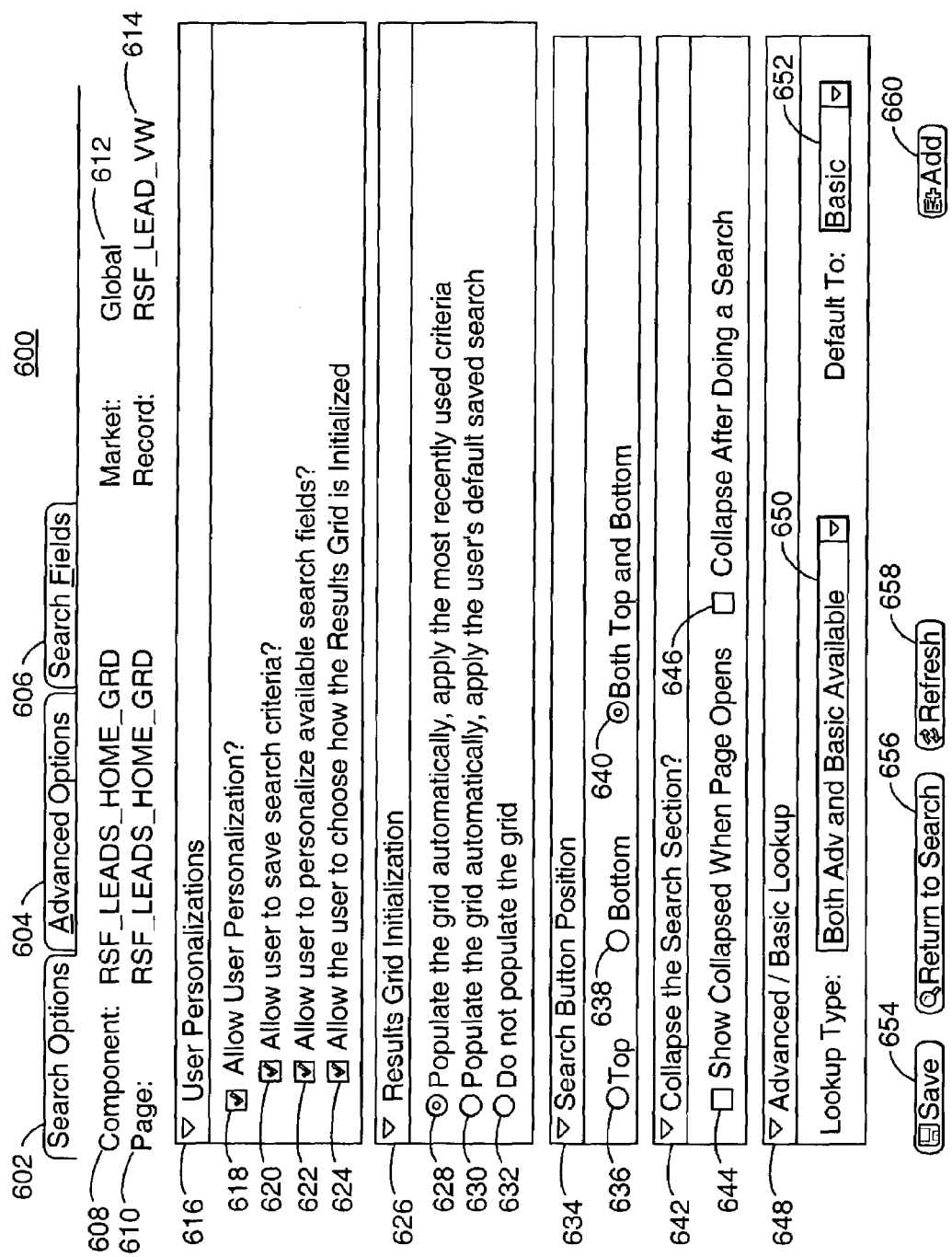
FIG. 6 is a screen shot of a search options page.

FIG. 6 is a screen shot of an embodiment of administrator portion 510 showing search options page 600. In an embodiment, search options page 600 includes tabs 602, 604, and 606, component field 608, page field 610, market field 612, record field 614, user personalizations dialog box 616, allow user personalization field 618, allow user to save search criteria field 620, allow user to personalize available search-fields field 622, allow user to choose how the results grid is initialized 624, results grid dialog box 626, most recently used criteria field 628, default saved criteria field 630, do not populate grid field 632, search icon position dialog box 634, top field 636, bottom field 638, both top and bottom field 640, collapse search section dialog box 642, collapse when page opens field 644, collapse after search field 646, advanced/basic lookup dialog box 648, look up type field 650, default type field 652, save icon 654, return to search icon 656, refresh icon 658, and add icon 660. In alternative embodiments, search options page 600 may not have all of the elements listed above, or may have other elements in addition to or instead of those listed above.

Tabs 602, 604, and 606 allow the administrator to view search options 514, advanced options 516, and search field 516, respectively. In FIG. 6 tab 602 is selected, and consequently search options page 600 is visible.

A component may contain a number of subunits such as pages. Component field 608 displays the name of a group of components. Page field 610 contains the name of the page on which the search is done. Market field 612 lists the market associated with the component of component field 608. Record field 614 contains the name of the record associated with the component. The record stores information related to the search settings in a manner such that entering the record name into record field 614 will set the settings to those stored in that record. The record of record field 614 belongs to primary table 112*a*. Component field 608, page field 610, market field 612, record field 614 correspond to component 424*a*, sector 424*b*, page 424*c*, record 424*d* of data filters 424 (FIG. 4, in this embodiment sector 424*b* is for identifying the market of interest).

Tabs 602, 604, and 606, component field 608, page field 610, market field 612, record field 614 also appear in FIGS. 7 and 8, discussed below. The description of tabs 602, 604, and 606, component field 608, page field 610, market field 612, record field 614 is the same for all three of FIGS. 6-8.

User personalizations dialog box 616 allows the administrator to set the options that the user is allowed to choose from. In the embodiment shown in FIG. 6, user personalizations dialog box 616 includes allow user personalization field 618, allow user to save search criteria field 620, allow user to personalize available search-fields field 622, allow user to choose how the results grid is initialized 624. However, in other embodiments, user personalizations dialog box 616 may have other fields in addition to and/or instead of these fields.

User personalization field 618 controls whether the user is allowed to personalize his or her search page. Save search criteria field 620 allows the user to save search criteria. Allow user to personalize available search-fields field 622 allows the user to personalize the available search fields, which may include choosing which search fields will be available for searching. The user may also be able to choose from a variety of search field formats. For example, one format may just be a simple box within which all the search terms and operators are entered. Another format that the user may be able to choose may include separate boxes for different terms. Some of the boxes may be reserved for particular fields. Other boxes may be reserved for operators such as "AND" and "OR." These boxes may be provided instead of or in combination with a box within which any number of terms and operators can be entered. The user may be able to choose how many and which other boxes and operators appear as well as which fields, if any, they correspond to. Allow user to choose how the results grid is initialized 624 may allow the user to choose whether the results field is initially blank, displays results from the last search performed, or displays results obtained by performing a new search using the same search query as the last one used (thereby updating the search), for example.

Results grid dialog box 626 allows the administrator to choose a default initialization that is used if the user does not choose other initialization options. In the embodiment shown in FIG. 6, results grid dialog box 626 includes most recently used criteria field 628, default saved criteria field 630, and do not populate grid field 632. However, in other embodiments, results grid dialog box 626 may have other fields in addition to and/or instead of these fields. When most recently used criteria field 628 is selected, a search may automatically be performed upon starting the program using the last search query entered by the user. Selecting default saved criteria field 630 may automatically perform the search if a search query was saved, but may otherwise initially leave the results grid blank. Alternatively, selecting default saved criteria field 630 may use a saved search query if one was saved, but use the last query searched if no search query was saved. If do not populate grid field 632 is selected, the grid may be left blank upon startup until a new search query is entered or a saved search query is activated.

Search icon position dialog box 634 controls the positioning of the search icon. In the embodiment of FIG. 6, the search icon is a button. However, other icons may be used. Search icon position dialog box 634 may include top field 636, bottom field 638, and both top and bottom field 640. In other embodiments, other fields related to other positions may be included in search icon dialog box 634 instead of or in addition to the fields shown in FIG. 6. Top field 636 causes the search icon to appear at the top of the search page. Similarly, bottom field 638 causes the search icon to appear at the bottom of the search page. Both top and bottom field 640 causes the search icon to appear both on the top and bottom of the search page. In an embodiment, only one of top field 636, bottom field 638, and both top and bottom field 640 may be selected at any one time. In an alternative embodiment, the top field 636 and the bottom field 638 can be selected simultaneously, having the same effect as selecting the both top and bottom field 640. In a variation of this embodiment, the both field 636 does not appear in search icon dialog box 634. Other positions for which fields may be provided are the corners, right side, and/or left side of the search page. Alternatively, the fields may relate to positions on the monitor screen, such as a position inside of a tool bar of the screen or a position unrelated to the positions of tool bars of the screen, for example. The positions may be the top, bottom, corners, and/or sides of the screen, for example. Search icon dialog box 634 may allow the administrator to determine the position of search icons by specifying coordinates on or clicking and pointing on a map of the screen and/or a search page.

Collapse search section dialog box 642 determines when the search section is automatically collapsed. Collapse when page opens field 644 causes the search section to initially be collapsed upon opening the page. Collapse after search field 646 causes the search section to automatically collapse after a search. In other embodiments, the search section may automatically collapse after a set period of time without use.

Advanced/basic lookup dialog box 648 determines the type of search (e.g., advanced, moderate, and/or basic) that the user can choose and/or the type of search that is initially presented to the user. User personalizations dialog box 616, results grid initialization dialog box 626, search icon position dialog box 634, collapse search section dialog box 642, and advanced/basic lookup dialog box 648 correspond to and are specific embodiments of user personalization 520, results grid initialization 522, search icon configuration 524, collapse search section 526, and advanced/basic lookup 528, respectively. However, user personalization 520, results grid initialization 522, search icon configuration 524, collapse search section 526, and advanced/basic lookup 528 may have other embodiments capable of functions not present in user personalizations dialog box 616, results grid initialization dialog box 626, search icon position dialog box 634, collapse search section dialog box 642, and advanced/basic lookup dialog box 648. For example, although in the FIG. 6 embodiment search icon configuration 524 is search icon position dialog box 634, in other embodiments search icon configuration 524 may be capable of controlling search icon configurations other than just the position, such as to which actions the search icon responds or whether an icon, a check box, or another type of entry field is used.

Clicking on the top bar of user personalizations dialog box 616, results grid initialization dialog box 626, search icon position dialog box 634, collapse search section dialog box 642, and advanced/basic lookup dialog box 648 toggles the corresponding dialog box between a collapsed and an expanded state. All of the dialog boxes of FIG. 6 are shown in their expanded state. Similarly, the dialog boxes of the other FIGS. of this application have an expanded and a collapsed state. Clicking on the top bar of the other dialog boxes of this application also toggles those dialog boxes between their expanded and collapsed states.

Lookup type field 650 is used to enter the types of searches available to the user. Default type field 652 determines the type of search presented to the user if the user does not choose a specific search type. Save icon 654 may allow the user to save the configuration. For example, save icon 654 may allow the administrator to save a group of settings for a particular user and/or save the group of settings as a template that can be applied to multiple users. Return to search icon 656 may return the administrator to a search page and may allow the administrator to conduct his or her own search and/or to test the user's main search page 512 to see if it behaves as expected. Refresh icon 658 may refresh the search options page so that the options selected match the user or group of users entered. Add icon 660 may allow the administrator to add a new user and/or group of users. Add icon 660 may allow the administrator to add the user settings just created to a list of user settings.

Figure 7:
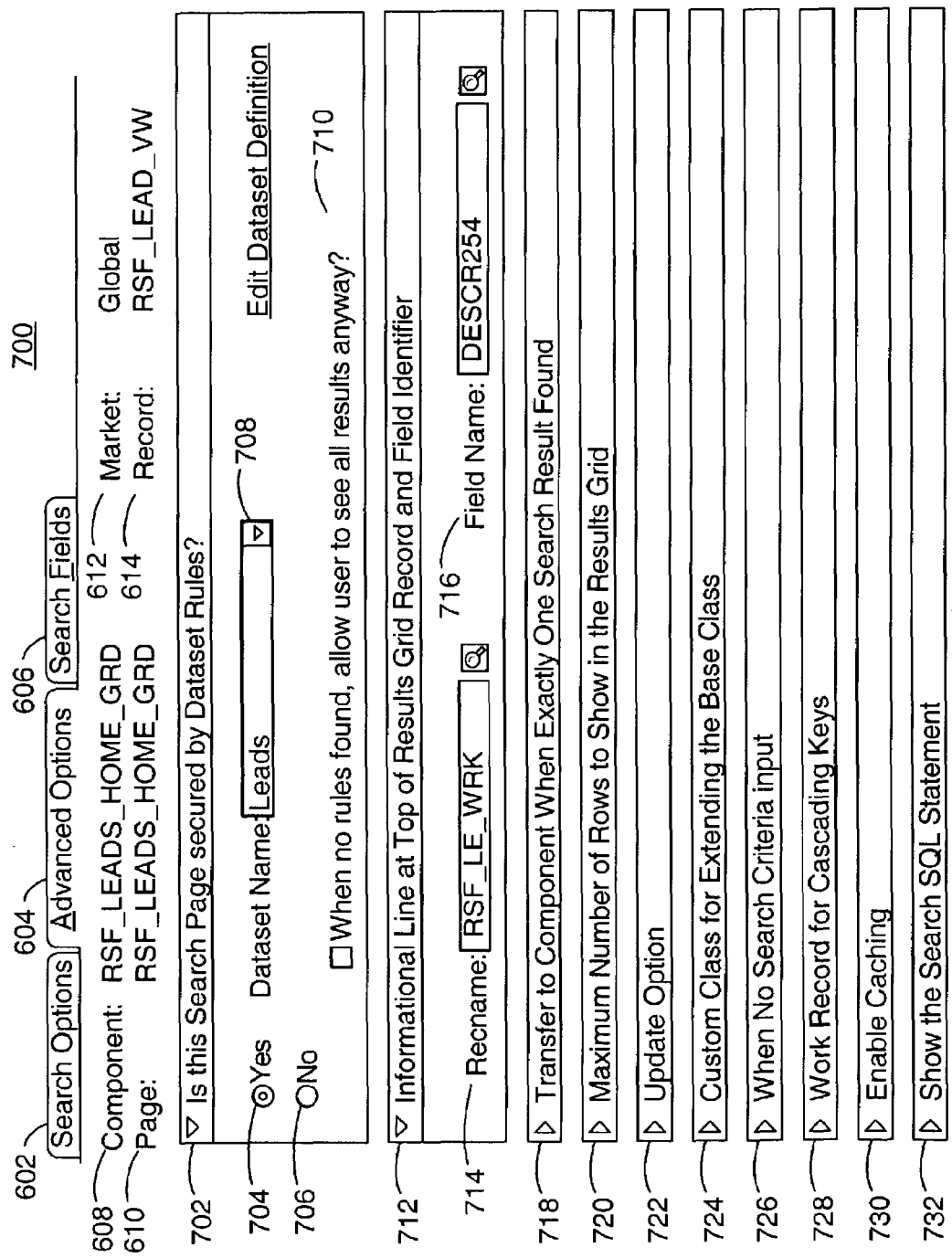
FIG. 7 is a screen shot of an advanced options page.

FIG. 7 is a screen shot of an advanced options page 700. In an embodiment, advanced options page 700 has tabs 602, 604, and 606, component field 608, page field 610, market field 612, record field 614, dataset security rules dialog box 702, yes field 704, no field 706, dataset name field 708, edit dataset 709, when no rules found field 710, information line dialog box 712, record name field 714, field name field 716, one search result dialog box 718, maximum rows dialog box 720, update option dialog box 722, custom class dialog box 724, no search criteria dialog box 726, work record for cascading keys dialog box 728, enable caching dialog box 730, and show the search SQL statement dialog box 732. In alternative embodiments, advanced options page 700 may not have all of the elements listed above, or may have other elements in addition to or instead of those listed above.

In FIG. 7, the tab 606 was selected causing advanced options page 700 to be displayed. Tabs 602, 604, and 606 are the same as tags 602, 604, and 606 of FIG. 6. Similarly, component field 608, page field 610, market field 612, record field 614 have the same function as the fields having the same numbers as in FIG. 6.

Dataset security rules dialog box 702 allows the administrator to choose security rules that govern access to the user's main search page 512 and/or the user's access to tables 112a-n of database 110. Selecting yes field 704 may activate the objects that implement the security rules, while selecting no field 706 may deactivate the objects that implement the security rules. Dataset name field 708 contains the names of datasets used to define security rules. For example, dataset name field 708 contains the names of datasets to which the user is entitled to access and/or the names of datasets that determine which user is granted access rights to the search page being configured by the administrator. Edit dataset 709 may allow the administrator to edit the dataset of dataset name field 708. Edit dataset 709 may also allow the administrator to add a new security dataset, thereby defining a new set of security rules. When no rules found field 710 determines the behavior when no security rules are in use, such as when dataset name field 708 is blank. In an embodiment, selecting when no rules found field 710 allows the user to search all datasets. Not selecting when no rules found field 710 may allow the user to search a default set of datasets or may not allow any datasets to be searched.

Information line dialog box 712 determines the contents of an information line displayed above the search results identifying the type of information being displayed. Record name field 714 may contain the file name or variable name identifying a record or the name of the record or records that are being searched, for example. Field name field 716 may contain the file name or variable name identifying a field or a group of fields being searched, for example.

Dataset security rules dialog box 702, information line dialog box 712, one search result dialog box 718, maximum rows dialog box 720, update option dialog box 722, custom class dialog box 724, no search criteria dialog box 726, work record for cascading keys dialog box 728, enable caching dialog box 730, and show the search SQL statement dialog box 732 are embodiments of security rules 530, information line setup 532, actions when only one search component found 534, visible rows 536, actions when no search criteria found 538, work record for cascading keys 540, caching 542, and SQL statement 544, respectively. Dataset security rules dialog box 702 and information line dialog box 712 are shown in their expanded state. The other dialog boxes are shown in their collapsed state.

Figure 8:
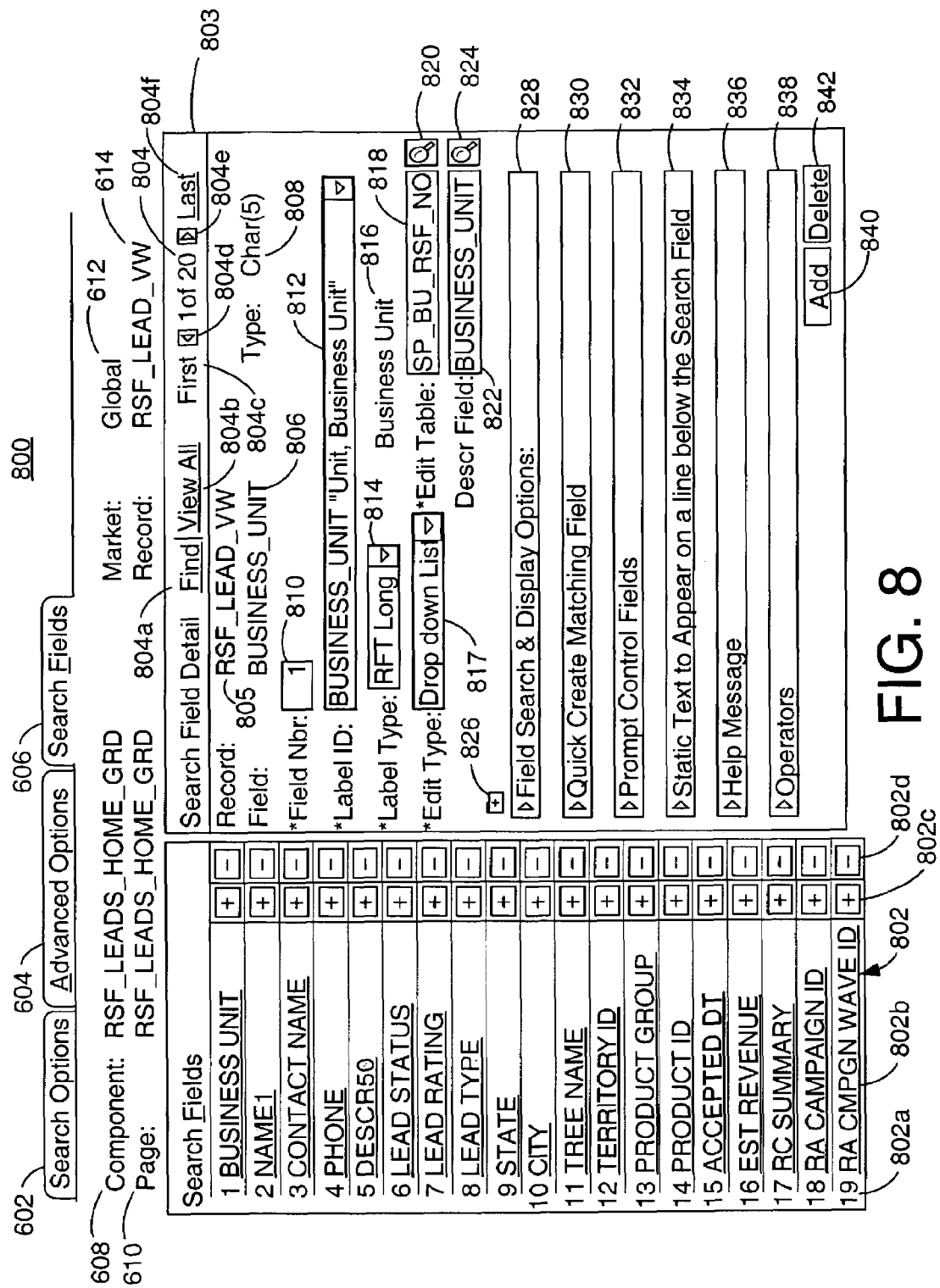
FIG. 8 is a screen shot of a search field page.

FIG. 8 is a screen shot of search field page 800. In an embodiment, search field page 800 includes tabs 602, 604, and 606, component field 608, page field 610, market field 612, record field 614, search fields dialog box 802, search field number column 802a, search field name column 802b, search field open icon column 802c, search field close icon column 802d, search field detail dialog box 803, navigation bar 804, find 804a, view all 804b, first 804c, backward increment 804d, forward increment 804e, last 804f, record name field 805, field name field 806, field name type field 808, field number field 810, label ID field 812, label type field 814, label field 816, edit type field 817, edit table field 818, zoom icon 820, description field 822, zoom icon 824, folder 826, field search and display options dialog box 828, quick create matching field dialog box 830, prompt control fields dialog box 832, static text dialog box 834, help message dialog box 836, operators dialog box 838, add icon 840, and delete icon 842. In alternative embodiments, search fields page 800 may not have all of the elements listed above, or may have other elements in addition to or instead of those listed above.

In FIG. 8 search field page 800 is displayed, because tab 606 is selected. Tabs 602, 604, and 606, component field 608, page field 610, market field 612, record field 614 are discussed in conjunction with FIG. 6.

Search field page 800 corresponds to search field page 518 of FIG. 5. Search fields dialog box 802 is an example of search fields page 545. Search fields dialog box 802 lists all the search fields that are available to the administrator for adding or removing from the search fields available to a user. Search fields dialog box 802 may also allow the administrator to view and enter the search fields and the search field options that are available to the user.

Search fields dialog box 802 includes search field number column 802*a*, search field name column 802*b*, search field close icon column 802*d*, and search field open icon column 802*c*. Search field number column 802*a* contains a list of numbers that may be used for identifying the search fields that are available to the user for searching. Search fields name column 802*b* contains a list of search field names in which each name corresponds to a search field number in search field number column 802*a*. Search field open icon column 802*c* and search field close icon column 802*d* may used by an administrator for adding predefined search fields to and removing predefined search fields from the set of search fields that the user can search. Search field open icon column 802*c* contains a column of icons, which when selected open dialog boxes related to the search field of the same row of the selected search field add icon if the dialog box is closed. Search field open icon column 802*d* contains a column of icons, which when selected close dialog boxes related to the search field name of the same row if the dialog box is open.

In an embodiment, if the search field is already open when search field expand icon 802*c* is selected or the search field is already closed when the search field close icon 802*d* is selected, then an error condition occurs, which is handled by an error handler. In an embodiment, the error handler handles this error in such a way that the user sees no response. In an alternative embodiment, an error message is displayed. Optionally, the error message may display a message explaining the nature of the error. Opening and/or closing of the dialog boxes associated with a search field may involve clicking with a pointing device (e.g., using a mouse or the enter key of a keyboard) on the search field expand icon 802*c* or search field close icon 802*d*. In an embodiment, the search field dialog boxes may be opened by clicking on a search field name from search field name column 802*b* and/or search field number from search field number column 802*a*. The option of opening search field dialog boxes using search field name column 802*b* and/or search field number column 802*a* may be provided instead of or in addition to the capability of using search field open icon column 802*c* and search field close icon column 802*d* for opening and closing search field dialog boxes, respectively.

Search field detail dialog box 803 may allow the administrator to view and change various details of the search options presented to a user. Search field detail dialog box 803 may include navigation bar 804, which is for navigating between search fields. Navigation tool bar 804 includes a find 804*a*, a view all 804*b*, a first 804*c*, a backward increment 804*d*, a forward increment 804*e*, and a last 804*f*. Find 804*a* may be used for finding a particular search field by doing a search. The search field found is displayed in the search field detail dialog box 803 if the search field found is different than the search field previously being displayed. View all 804*b* is for viewing all of the available search fields. In an embodiment, the search fields listed in search fields 802 are all of the possible search fields that the administrator can add to the search options of the user, while the search fields of view all 804*b* are all the search fields that were actually added to the user's search options. In an alternative embodiment, the search fields listed in search fields 802 are all of the possible search fields that constitute the search options of the user, while the search fields of view all 804*b* are all of the possible search fields that the administrator can add to the user's search options.

First 804*c* and last 804*f* bring the administrator to the first and last search fields, respectively. Similarly, backward increment 804*d* and forward increment 804*e* increment to the previous and next search field, respectively. In an embodiment, the search fields searched with find 804*a*, first 804*c*, backward increment 804*d*, forward increment 804*e*, and last 804*f* are all possible search fields available. Alternatively, the search fields being searched are all of the fields that the user is capable of searching. Accordingly, to edit a new search field, that search field must first be added to the user's search fields using an open icon from open icon column 802*c*. In this embodiment, open icon column 802*c* and close icon column 802*d* are add and remove icon columns, respectively.

Continuing with the description of search field detail 803, record name field 805 displays the name of the record that can be searched. The record of record name field 805 may be one of secondary tables 112*b-n* or may be primary table 112*a*. When the entry of record name field 805 is different than that of record name field 614, then the record of record name field 805 is from one of secondary tables 112*b-n*, and a multiple table search is being performed.

Field name field 806 contains the name of the variable that stores the name of the field. Type field 808 contains the type of variable used for field name field 806. In an embodiment, some of the types that the administrator enters into type field 808 are integer, floating point, character, pointer, or a memory address. In the example shown in FIG. 8, the name of the variable that stores the field name is "BUSINESS_UNIT," as denoted by field name field 806. The variable, BUSINESS_UNIT, is of the type character (e.g., a variable that consists of alphanumeric characters placed in a string), as denoted by the letters "Char," and the variable is five bits long or is five alphanumeric characters placed in a string, as denoted by the "(5)" appended to "Char."

Field number field 810 contains the number associated with a field according to the numbering given in field number column 802*a*. Field number field 810 can be used to change the numbering of the fields displayed in field number column 802*a*. Optionally, the user may be able to edit the field number by typing over the desired field number in field number column 802*a* instead of or in addition to being able to use field number field 810 for editing the field number. The field number may control the order in which the search fields are displayed in search fields dialog box 802 and/or the order in which the search fields are presented to the user. The user may be able to reference the fields by their number and/or name while searching.

Label ID field 812 allows the administrator to choose the values of the variable defined by field name field 806. In an embodiment, the field name may have multiple values, such as a long name and a short name. In an embodiment, the multiple values may be placed after the variable name within label ID field 812. In an embodiment, the multiple values may be placed within quotation marks separated by commas. In the example shown in FIG. 8, the variable "BUSINESS_UNIT" has two values, which are the short name (e.g., "Unit") and the long name (e.g., "Business Unit"), as shown in the box associated with Label ID field 812.

Label type field 814 describes the type of label associated with the value of the label ID of label ID field 812. The actual value of the field referred to in label type field 814 is displayed in label field 816. The value displayed in label field 816 is also one of the values listed in label ID field 812. In the example shown in FIG. 8, the type is Rich Formatted Text Long (RFT Long), which has the value "Business Unit," as displayed in label field 816.

Edit type field 817 controls the manner in which the user is allowed to edit the search field of search field name field 806. The method allowed in the current example is a drop down list that lists all the possible values of the search field. Other possible edit types may allow the user to enter any combination of alphanumeric characters instead of or in addition to a drop down list, for example.

Edit table field 818 may contain a name of a table of options that the user can choose from when editing the search field. For example, if the edit type field 817 is set to drop down list, all the choices that are on the drop down list are listed in the table of edit table 818. The details of the edit table can be viewed by clicking on zoom icon 820. Description field 822 contains the name of a file having a description of the field that may be longer and/or more descriptive than the long name, for example. Clicking on zoom icon 824 allows the administrator to view the full description and/or edit the description.

Clicking on folder icon 826 with a pointing device may collapse search field detail dialog box 803 or in an alternative embodiment may expand all of the collapsed dialog boxes. Field search and display options dialog box 828, quick create matching field dialog box 830, prompt control fields dialog box 832, static text dialog box 834, help message dialog box 836, and operators dialog box 838 are in their collapsed state in search detail dialog box 803. Search and display options dialog box 828, quick create matching field dialog box 830, prompt control fields dialog box 832, static text dialog box 834, help message dialog box 836, and operators dialog box 838 correspond to and are examples of field search and display options 548, quick create matching field 550, prompt control fields 551, static text 552, help messages 554, and operators 556, respectively. In the example shown in FIG. 8, static text dialog box 834 allows the administrator to edit text just below the user's search field. However, static text 552 may allow the administrator to edit other static text on the user's search screen as described in conjunction with FIG. 5. Add icon 840 is used to add the search field from those that can be searched, and delete icon 842 is used for deleting a search field that can be searched by the user.

Figure 9:
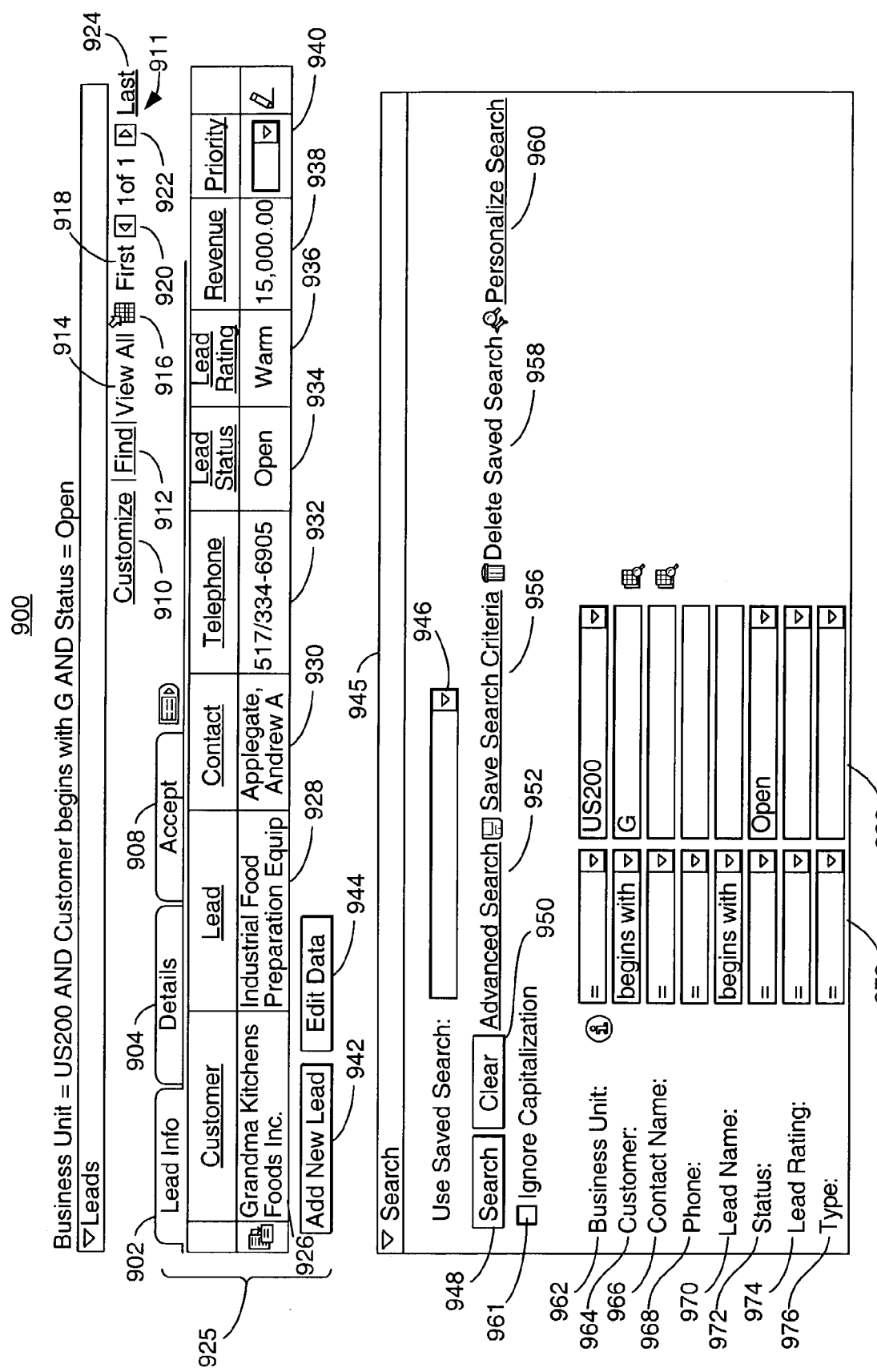
FIG. 9 is a screen shot of a search page.

FIG. 9 is a screen shot of a search page 900. In an embodiment, search page 900 may include lead information tab 902, details tab 904, accept tab 908, customize link 910, navigation bar 911, find 912, view all 914, spreadsheet 916, first 918, backward increment 920, forward increment 922, last 924, lead section 925, customer 926, lead 928, contact 930, telephone number 932, lead status 934, lead rating 936, revenue 938, priority 940, add new lead icon 942, edit data 944, search dialog box 945, use saved search box 946, search 948, clear icon 950, advanced search link 952, save search criteria link 956, delete saved search icon 958, personalize search link 960, ignore capitalization field 961, business unit search field 962, customer search field 964, contact name search field 966, phone search field 968, lead name search field 970, status field 972, lead rating field 974, lead type field 976, operator column 978, and search criteria column 980.

Search page 900, lead information tab 902, details tab 904, and accept tab 908 correspond to searcher portion 512, detail 558, and accept 560, respectively. Customize link 910 allows the user to customize the layout of search page 900. Navigation bar 911 is used for navigating among the hits found in the search. Find 912 is used for searching among the hits found for a particular hit. Spreadsheet 916 exports the hits found to a spreadsheet such as Excel®. Navigation bar 911 is similar to navigation bar 804 (FIG. 8). Accordingly, view all 914, first 918, backward increment 920, forward increment 922, and last 924 allow the user to view all the hits, jump to the first hit, increment to the previous hit, increment to the next hit, and jump to the last hit, respectively.

Lead section 925 corresponds to and is an example of information 562. Lead section 925 may be used for displaying and entering information related to leads. Lead section 925 may be used to show the results of a search. In the example of FIG. 9, only one lead is displayed. In the example of FIG. 9, the lead information includes a customer 926, lead 928, contact 930, telephone number 932, lead status 934, lead rating 936, revenue 938, and priority 940. Customer 926 is the name of a potential customer. Lead 928 is the name of the company that introduced the salesperson to the customer 926, while contact 930 is the name of the person to contact regarding the potential customer. Telephone number 932 is the telephone number of contact 930, and lead rating 936 gives a qualitative and/or a quantitative evaluation of the quality of the lead. Lead status 934 gives the status of the lead regarding whether the customer associated with the lead is still open to sales pitches or already a customer. Revenue 938 is the income of customer 926. Priority 940 gives a rating for the priority level assigned to pursuing this lead. In an embodiment, priority 940 displays either a blank or displays a numerical value indicating a relative priority. An icon depicting a pencil is used to signify that the associated row can be edited. Add new lead icon 942 is for adding new leads. Edit data 944 is for editing the data associated with a lead. The details of the displayed lead can be viewed using details tab 904.

Search dialog box 945 corresponds to search 564, and is used by the user to search a database, for example. Use saved search box 946 is used for entering a saved search query. Use saved search box 946 may have a dropdown list associated with it for selecting a previously searched search query. Search icon 948 is used for initializing a search after it is entered into the use saved search box 946 or the fields associated with operator column 978 and search criteria column 980. Clear icon 950 is used for clearing use saved search box 946, operator column 978, and/or search criteria column 980, thereby allowing a new search to be entered. In an embodiment, use saved search box 946 may allow a new search to be entered in addition to or instead of only accepting saved searches, and may be labeled "Search Query," for example.

Advanced search link 952 corresponds to advanced search 568. In an embodiment, the user can toggle between the advanced search and basic search. Save search criteria link 956 may save the search query to a temporary and/or long term storage medium. Delete saved search icon 958 may delete a saved search result, a set of saved search results and/or a saved search criteria. Personalize search link 960 corresponds to a link to personalization section search 506. Ignore capitalization field 961 may be used to determine whether to look for certain letters if they have been capitalized. In an embodiment, ignore capitalization field 961 could be replaced with a case field 961 that selects whether the search should look for a particular case (upper case and/or lower case). In an embodiment the case sensitivity may be applied to a particular letter or group of letters of a search query or to the entire search query.

Search box 945 may include several search fields in addition to use saved search box 946. In the example shown in FIG. 9 a business unit search field 962, a customer search field 964, contact name search field 966, a phone search field 968, a lead name search field 970, a status field 972, a lead rating field 974, and a lead type field 976 are included. Operator column 978 allows the user to enter an operator to apply to the search criteria being searched. Search criteria column 980 contains fields for entering the search criteria. For example, in customer search field 964 the operator "begins with" is applied to the search criteria "G," which causes the search engine to search for any customer having a name beginning with "G."

Figure 10:
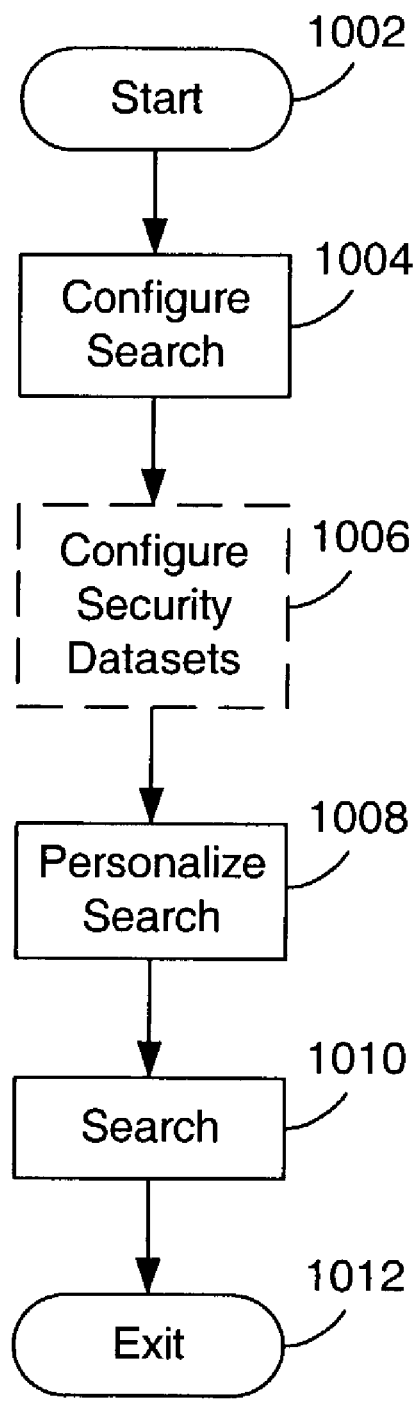
FIG. 10 is a flowchart showing a method of using the search engine of FIG. 3.

FIG. 10 is a flowchart showing a method 1000 of using search engine 302. Method 1000 starts with step 1002, which may include turning on appliance 102, web server 106, and/or application server 108. Step 1002 may include installing search engine 302, logging into application server 108, and/or logging into search engine 302. The administrator may be able to log into application server 108 via input/output system 206 directly, via the input/output system of web server 106, and/or via the input/output system of appliance 102. Similarly, step 1002 may include opening search engine 302 and/or choosing the appropriate tab of start page 508 to enter or open configuration portion 502.

Step 1004 involves the administrator navigating through the appropriate pages, fields, and/or dialog boxes of configuration portion 502 and making the selection he or she desires. Stated differently, step 1004 may involve the administrator viewing a set of search options, and specifying which of the set of search options will be available to a searcher while searching. Step 1004 thereby alters which of the set of search options are visibly available for the searcher to choose from.

Step 1006 is optional as indicated by the dotted line forming its box. In step 1006, the administrator chooses the security access he or she wishes to grant to the user, thereby limiting or changing which components that user can search. Steps 1004 and/or 1006 may rely on the entity relationship of FIG. 4B. Steps 1004 and 1006 need to be performed for each user and/or each group of users needing the same configuration. At the end of step 1004 or 1006 the administrator may exit the system. In an embodiment, steps 1004 and/or 1006 may be performed automatically and/or may be performed by just accepting a set of default settings corresponding to a default configuration. Steps 1004 and 1006 only need to be performed once after or as part of installing search engine 302, but may be repeated whenever the administrator desires. Once search engine 302 is configured for a particular user, in step 1004, that user may enter the data retrieval system 100, open search engine 302, and perform step 1008 by further personalizing the search settings. Alternatively, step 1008 may be performed automatically, as part of the installation of search engine 302, and/or by just accepting default settings. Similar to step 1004 and 1006, step 1008 only needs to be performed once. Afterwards, method 1000 may skip to step 1010 without having steps 1002-1008 performed again. In step 1010, the user or the administrator performs a search. In step 1012, the user and/or administrator exit search engine 302 by logging off and/or by shutting down search engine 302.

Figure 11:
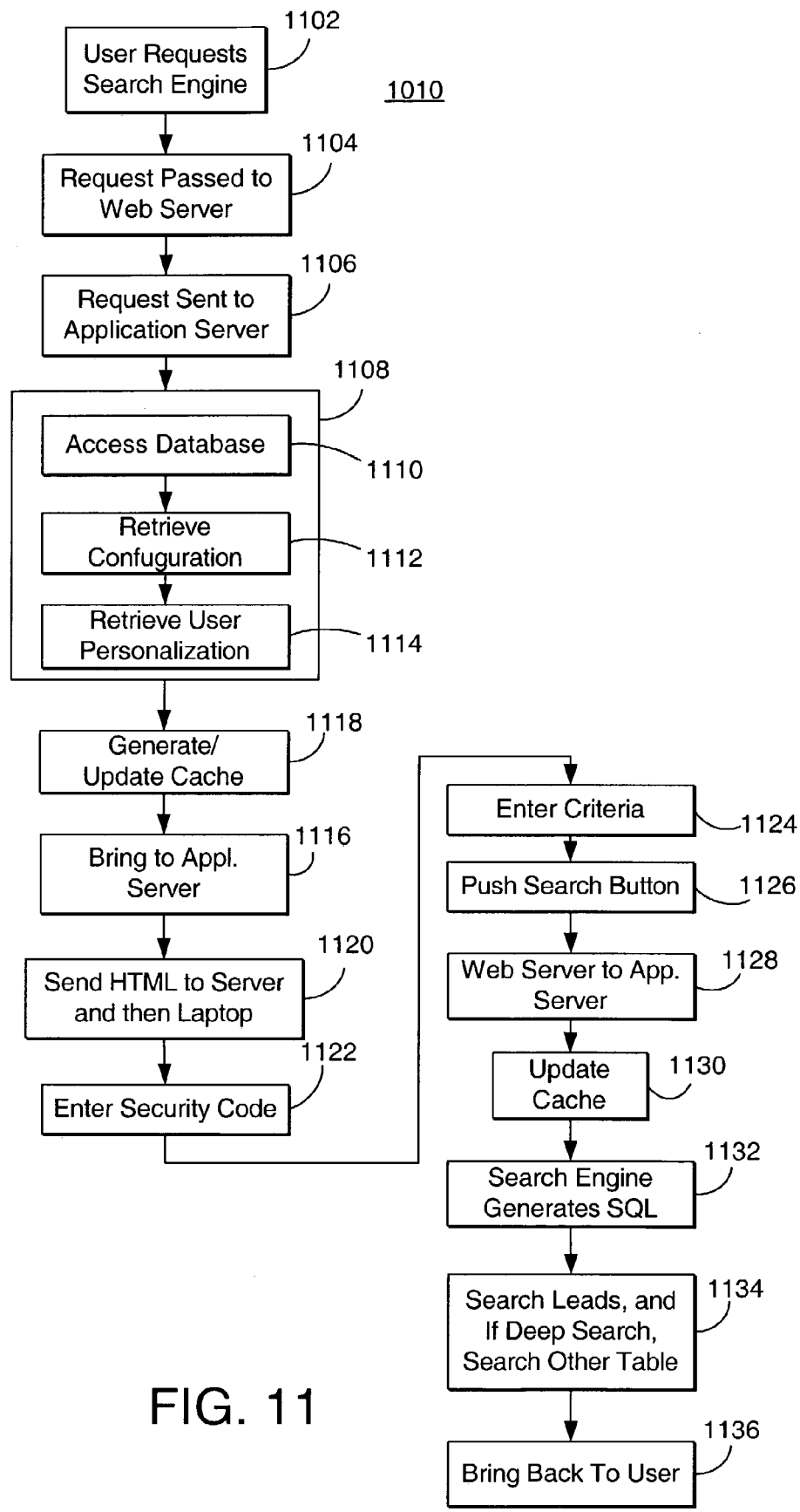
FIG. 11 is a flowchart for an embodiment of the search step of the method of FIG. 10.

FIG. 11 is a flowchart showing the steps of step 1010 of method 1000. In step 1102, the user makes an entry to his or her appliance 102 requesting use of search engine 302. In an embodiment, the request may include a search query. In step 1104, the request is sent via network 104 to web server 106. In step 1106, the request is sent to application server 108. Application server 108 opens search engine 302, if it is not already open. If a search query was not yet sent to application server 108, search engine 302 may send a signal via web server 106 and network 104 to appliance 102 prompting the user for a search query. In step 1108, configuration data storage 118 and personalization data storage 120 associated with search engine 302 are retrieved, and tables 112a-n may be accessed. Step 1108 may include steps 1110, 1112, and 1114. In step 1110, search engine 302 directs application server 108 to access database 110. As part of accessing database 110, search engine 302 may search tables 114a-m to fill the initialization grid.

In step 1112, the configuration data storage 118 is retrieved. In step 1114, the user's personalization data storage 120 is retrieved. In step 1116, the results of accessing database 110 are brought back to application server 108. The manner in which the search results and the initialization grid are presented may depend upon configuration data storage 118 and personalization data storage 120. In step 1118, information related to the configuration, personalization, and/or search is either stored for the first time or updated in a cache associated with application server 108. In step 1120, a file is generated for the purpose of directing appliance 102 to display the results of accessing database 110 on a screen associated with appliance 102. For example, step 1120 may include sending an HTML or XML file to appliance 102.

In step 1122, the user enters security codes. In step 1124, the user enters a search query into appliance 102. In step 1126, the user pushes a search icon to start the search. In step 1128, the security options and the search query are sent via network 104 and web server 106 to application server 108. In step 1130, the cache is updated. In step 1132, application server 108 via search engine 302 generates a search statement in a programming language. For example, step 1132 may include generating an SQL search statement. In step 1134, table 112a in database 110 is searched using the search statement of step 1132. If required, one or more of secondary tables 112b-m are also searched without indicating to the user how many or which tables are being searched. In step 1134, the search results are brought from database 110 via application server 108, web server 106, and network 104 to appliance 102.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

What is claimed is:

1. A data retrieval system for providing a configurable search engine, comprising:
   at least one processor; and
   a memory device storing instructions that, when executed by the processor, cause the processor to:
   display a first set of search engine related options to a user having a first level of access, the first set of search engine related options being displayed in a configuration portion of a search engine interface, the first set of search engine related options comprising a plurality of search fields usable for performing searches;
   allow the user to specify which of the first set of search engine related options will be available to each of a plurality of searchers having a second level of access, the plurality of searchers comprising a first searcher and the search engine related options specified for the first searcher constituting a second set of search engine related options, and to further specify an extent to which each searcher is able to personalize the set of search engine related options specified for the searcher, wherein at least one search field included in the first set of search engine related options is not included in the second set of search engine related options specified for the first searcher;
   display the second set of search engine related options to the first searcher having the second level of access in a personalization portion of the search engine interface;
   allow the first searcher to specify at least one personalization setting related to at least one option in the second set of search engine related options available to that searcher in a searcher portion of the search engine interface up to the extent specified by the user; and display the searcher portion of the search engine interface to the first searcher to allow the first searcher to execute a search using the search engine, the searcher portion displaying the second set of search engine related options according to the at least one personalization setting specified by the first searcher.

2. The system of claim 1, wherein the search engine includes a window for displaying a Structured Query Language (SQL) search query formed in response to the first searcher inputting a search query in a location other than the window.

3. The system of claim 1, wherein the search engine is structured such that in response to a search query being entered into the search engine in a first form, the search engine converts the search query into a second form that is used for conducting a search.

4. The system of claim 3, wherein the second form is a programming language.

5. The system of claim 1, wherein the configuration portion comprises:
   a search options section for configuring search options of the searcher portion; and
   a search fields section for configuring the search fields used in the searcher portion.

6. The system of claim 1, further comprising a database that is accessible for storing and retrieving data.

7. The system of claim 6, wherein the database stores configuration data for configuring the search engine.

8. The system of claim 7, wherein the database stores personalization data for personalizing the search engine within parameters allowed by the configuration data.

9. The system of claim 6, wherein the database stores tables containing component information.

10. The system of claim 6 further comprising a web server for handling communications over a network.

11. A method for providing a configurable search engine, comprising:
   providing a user with a first set of search engine related options for the configurable search engine, the user having a first level of access, the first set of search engine related options comprising a plurality of search fields usable for performing searches;
   allowing the user to specify which of the first set of search engine related options will be available to each of a plurality of searchers having a second level of access, the plurality of searchers comprising a first searcher and the search engine related options specified for the first searcher constituting a second set of search engine related options, and to further specify an extent to which each searcher is able to personalize the set of search engine related options specified for the searcher, wherein at least one search field included in the first set of search engine related options is not included in the second set of search engine related options specified for the first searcher;
   displaying the second set of search engine related options to the first searcher having the second level of access;
   allowing the first searcher to specify at least one personalization setting related to at least one option in the second set of search engine related options available to that searcher to the extent specified by the user; and
   displaying a searcher portion of the configurable search engine to the first searcher to allow the first searcher to execute a search using the search engine, the searcher portion displaying the second set of search engine related options according to the at least one personalization setting specified by the first searcher.

12. The method of claim 11, wherein the first set of search engine related options includes operators that are available to the searcher for searching a designated search field.

13. The method of claim 11, wherein allowing the user to specify which of the first set of search engine related options will be available includes allowing the user to select at least a search field from a predetermined list of search fields.

14. The method of claim 13, further comprising automatically adding new fields to the list of search fields.

15. The method of claim 13, further comprising associating two search fields.

16. The method of claim 11, further comprising, in response to a searcher entering a search definition:
   searching for information about a component by using a category identification for searching a first category of information stored in a first table;
   extracting a component identification from the information about the component; and
   using the component identification for finding information from a second category of information stored in a second table.

17. The method of claim 16, wherein the component identification is a synchronization identifier.

18. A computer readable storage medium storing a computer program product for controlling a processor to provide a configurable search engine, the computer program product comprising:
   code for providing a user with a first set of search engine related options for the configurable search engine, the user having a first level of access, the first set of search engine related options comprising a plurality of search fields usable for performing searches;
   code for allowing the user to specify which of the first set of search engine related options will be available to each of a plurality of searchers having a second level of access, the plurality of searchers comprising a first searcher and the search engine related options specified for the first searcher constituting a second set of search engine related options, and to further specify an extent to which each searcher is able to personalize the set of search engine related options specified for the searcher, wherein at least one search field included in the first set of search engine related options is not included in the second set of search engine related options specified for the first searcher;
   code for displaying the second set of search engine related options to the first searcher having the second level of access;
   code for allowing the first searcher to specify at least one personalization setting related to at least one option in the second set of search engine related options available to that searcher to the extent specified by the user; and
   code for displaying a searcher portion of the configurable search engine to the first searcher to allow the searcher to execute a search using the search engine, the searcher portion displaying the second set of search engine related options according to the at least one personalization setting specified by the first searcher.

* * * * *

UNITED STATES PATENT AND TRADEMARK OFFICE
CERTIFICATE OF CORRECTION

| | |
|---|---|
| PATENT NO. | : 7,567,964 B2 |
| APPLICATION NO. | : 10/434983 |
| DATED | : July 28, 2009 |
| INVENTOR(S) | : John Brice et al. |

Page 1 of 1

It is certified that error appears in the above-identified patent and that said Letters Patent is hereby corrected as shown below:

In the drawings:
On sheet 11 of 11, in Figure 11, Ref. Numeral 1112, line 2, delete "Confuguration" and insert -- Configuration --, therefor.

Signed and Sealed this

Twenty-ninth Day of June, 2010

David J. Kappos
*Director of the United States Patent and Trademark Office*